United States Patent
Mendenhall

(10) Patent No.: US 7,096,771 B2
(45) Date of Patent: Aug. 29, 2006

(54) CUTTER BLADE ASSEMBLY FOR CUTTING SCOOP SHAPED VEGETABLE PRODUCTS

(76) Inventor: George A. Mendenhall, 4252 S. Eagleson Rd., Boise, ID (US) 83705

( * ) Notice: Subject to any disclaimer, the term of this patent is extended or adjusted under 35 U.S.C. 154(b) by 0 days.

(21) Appl. No.: 10/231,924

(22) Filed: Aug. 29, 2002

(65) Prior Publication Data

US 2004/0040427 A1    Mar. 4, 2004

(51) Int. Cl.
*B26D 1/03* (2006.01)
*B26D 3/26* (2006.01)

(52) U.S. Cl. .................. 83/857; 83/402; 83/404.3; 83/425.1; 83/425.3; 83/858; 83/932

(58) Field of Classification Search .............. 83/402, 83/404.3, 404.4, 856–858, 24, 98, 404.2, 83/407, 408, 425.2, 425.3, 425.4, 425.1, 83/932; 99/537, 538, 543, 545; 426/144, 426/518

See application file for complete search history.

(56) References Cited

U.S. PATENT DOCUMENTS

| | | | | |
|---|---|---|---|---|
| 678,514 A | * | 7/1901 | Regnier | 83/856 X |
| 1,748,997 A | * | 3/1930 | Rentos | 83/407 |
| 2,677,403 A | * | 5/1954 | Brown et al. | 83/404.2 |
| 3,057,386 A | * | 10/1962 | Massaro | 83/404.3 X |
| 3,273,617 A | * | 9/1966 | Lamb | 83/90 |
| 3,502,126 A | * | 3/1970 | Howard | 83/404.3 X |
| 3,948,132 A | * | 4/1976 | Camp | 83/858 X |
| 3,956,518 A | * | 5/1976 | Goldbach | 426/518 |
| 4,372,184 A | * | 2/1983 | Fisher et al. | 83/404.3 X |
| 4,523,503 A | * | 6/1985 | Julian et al. | 83/404.3 X |
| 4,766,793 A | * | 8/1988 | Fischer et al. | 83/857 X |
| 4,911,045 A | | 3/1990 | Mendenhall | 83/98 |
| 5,046,388 A | | 9/1991 | Mendenhall | 83/98 |
| 5,058,478 A | | 10/1991 | Mendenhall | 83/857 |
| 5,095,794 A | | 3/1992 | Mendenhall | 83/858 |

* cited by examiner

*Primary Examiner*—Clark F. Dexter
(74) *Attorney, Agent, or Firm*—Frank J. Dykas; Dykas, Shaver & Nipper

(57) ABSTRACT

A cutter blade assembly that presents a sequential series of perpendicularly oriented cutting knife arrays which are attached to a frame. A first set of cutting knives is comprised of knives that are generally scalloped shaped. A second set of cutting knives is comprised of knives that are generally straight and are connected in general perpendicular orientation to the first set of strip knives. When a vegetable product such as a potato is forced through the cutter blade assembly, the first set of knives cuts the potato into a scalloped shaped slab. The second set of knives then cuts the slab into a scoop shaped potato piece emulating a portion of a cut stalk of celery.

13 Claims, 6 Drawing Sheets

CUTTER BLADE ASSEMBLY FOR CUTTING SCOOP SHAPED VEGETABLE PRODUCTS

BACKGROUND OF THE INVENTION

1. Field of the Invention

This invention relates to cutting blade assemblies for hydraulic food cutting apparatuses. More particularly it relates to a cutter blade assembly for hydraulic food cutting apparatuses that cut a food product into a plurality of scoop shaped pieces, each piece generally emulating the shape of a cut section of celery, and ready for use without further cutting.

2. Background Art

Many food products, particularly vegetables and fruits, are processed prior to sale either by canning or freezing. Unless the product involved is of a naturally occurring edible size, for example peas, the product is usually trimmed and sliced, or diced, to an edible size prior to preservation processing such as canning or freezing. These slicing, dicing and other cutting operations have traditionally been accomplished with mechanical cutters. However, relatively recent advances in food product cutting technologies have resulted in the common use of hydraulic cutting apparatuses which can be used to cut relatively huge quantities of food product at very high speeds. Cutting capacities of 13,600 kilograms to 22,700 kilograms per hour are not unusual.

In a typical hydraulic cutting apparatus wherein potatoes are to be cut, the potatoes are dropped into a tank filled with water and then pumped through a conduit into an alignment chute wherein the potatoes are aligned and accelerated to high speeds before impinging upon a cutter blade assembly where the potato is cut into a plurality of smaller pieces. Hydraulic cutting apparatuses, or as they are known in the trade, hydroknives, can be utilized to cut extremely high volumes of potatoes if the potatoes can be properly aligned and accelerated to high speeds immediately prior to impact with the cutter blade assembly.

U.S. Pat. No. 4,372,184 to Fisher et al. discloses a cutter blade assembly for use in coring a potato.

Quite obviously there are a variety of applications for hydraulic cutter knives other than just for potatoes. Some of these would include beets, pickles, carrots, apples, pineapples and literally a host of other edible food products.

None of the prior art discloses or teaches a method of utilizing a hydroknife apparatus for cutting a potato into a finished decorative form so as to enhance the marketing value of the processed food product. Likewise, none of the prior art discloses a device that cuts decorative potatoes in a finished decorative form. While the prior art does disclose the direct cutting of a decorative shape within a core, which is then passed on for further cross cutting, see for example my patent U.S. Pat. No. 4,911,045, the prior art does not disclose a device, which can cut a plurality of finished decorative potato pieces through the use of a hydroknife.

Likewise, while cutting processes have been developed which cut potato products into variety of decorative or fanciful designs and shapes. These processes require further processing such as cross cutting in order to finalize the preparation of the food product. Likewise, none of the prior art discloses or teaches a method of utilizing a hydroknife apparatus for cutting a potato into a shaped form that is both decorative as well as useful. None of the prior art describes a cutting process that produces an edible product with a scoop portion capable of delivering another food product to a user.

Accordingly, it is an object of the invention to provide a cutting device which provides a plurality of decoratively shaped vegetable pieces in final form from a single vegetable piece. It is another object of the invention to provide a cutting blade assembly for use in a hydraulic cutting apparatus that cuts a plurality of decoratively shaped vegetable pieces in final form from a single vegetable piece. A further object of the invention is to provide a cutter blade assembly for use in a hydraulic cutting apparatus which produces a plurality of generally elongated scoop shaped pieces generally emulating a section of a piece of celery from a vegetable such as a potato.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These objects are achieved by the use of a cutter blade assembly that is configured so that the assembly presents a sequential series of perpendicularly oriented cutting knife arrays in a descending pyramidal order. Each array is configured so that the vegetable product entering the cutter blade assembly sequentially engages each array of cutter knives as it passes through the cutter blade assembly.

In a first embodiment of the invention, a front inlet adapter plate allows passage of an accelerated uncut food product and carrier medium into a longitudinal passageway defined by two pairs of opposing pyramidal frame members. Attached to each pair of frame members are a plurality of sequentially staggered arrays of strip knives. A first set of strip knives is made up of a plurality of knives. Each knife being generally corrugated in shape and having a series of alternating peaks and troughs. These knives are attached in pairs to opposing pyramidal frame members. The spacing between the knives located nearest to the upstream end of the cutter assembly is greatest and the spacing between the knives decreases progressively to the last pair of knives that are located near the downstream end of the cutter assembly. As the product moves through these knives, these pairs of knives cut slabs of vegetable product having two parallel edges with coordinated peaks and troughs. As the slab moves progressively through the cutter assembly, the cutter knives downstream cut progressively smaller slabs from the larger vegetable slab.

A second set of generally straight strip knives are attached to a second set of frame members and are placed in a generally perpendicular orientation with the first set of strip knives oriented so that each knife of the first and second sets of strip knives generally intersect at a peak of the first set of knives. This generally perpendicular arrangement provides structural strength to the cutting blade assembly, and reinforces the knives against the impact of the vegetable product. This arrangement also aligns the first and second plurality of knives so that the straight knives will cut the corrugated slabs at its peaks. Depending upon the exact configuration of the first plurality of knives, the slabs produced may have any of a variety of generally corrugated shapes. The arrangement of the second plurality of knives determines where these generally corrugated slabs are then perpendicularly cut to form the desired shaped pieces.

The different combinations of shapes and spacing can produce a variety of shaped pieces including but not limited to V-shaped troughs, W-shaped troughs and elongated scoop shaped pieces of vegetable matter generally emulating a section of cut celery. These shaped pieces need no further cut processing after exiting the cutting assembly. Furthermore, the sequential arrangement of the strip knives along the pyramidal sections also result in less damage to the products being cut because of a decrease in compressive forces which cause cellular damage.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
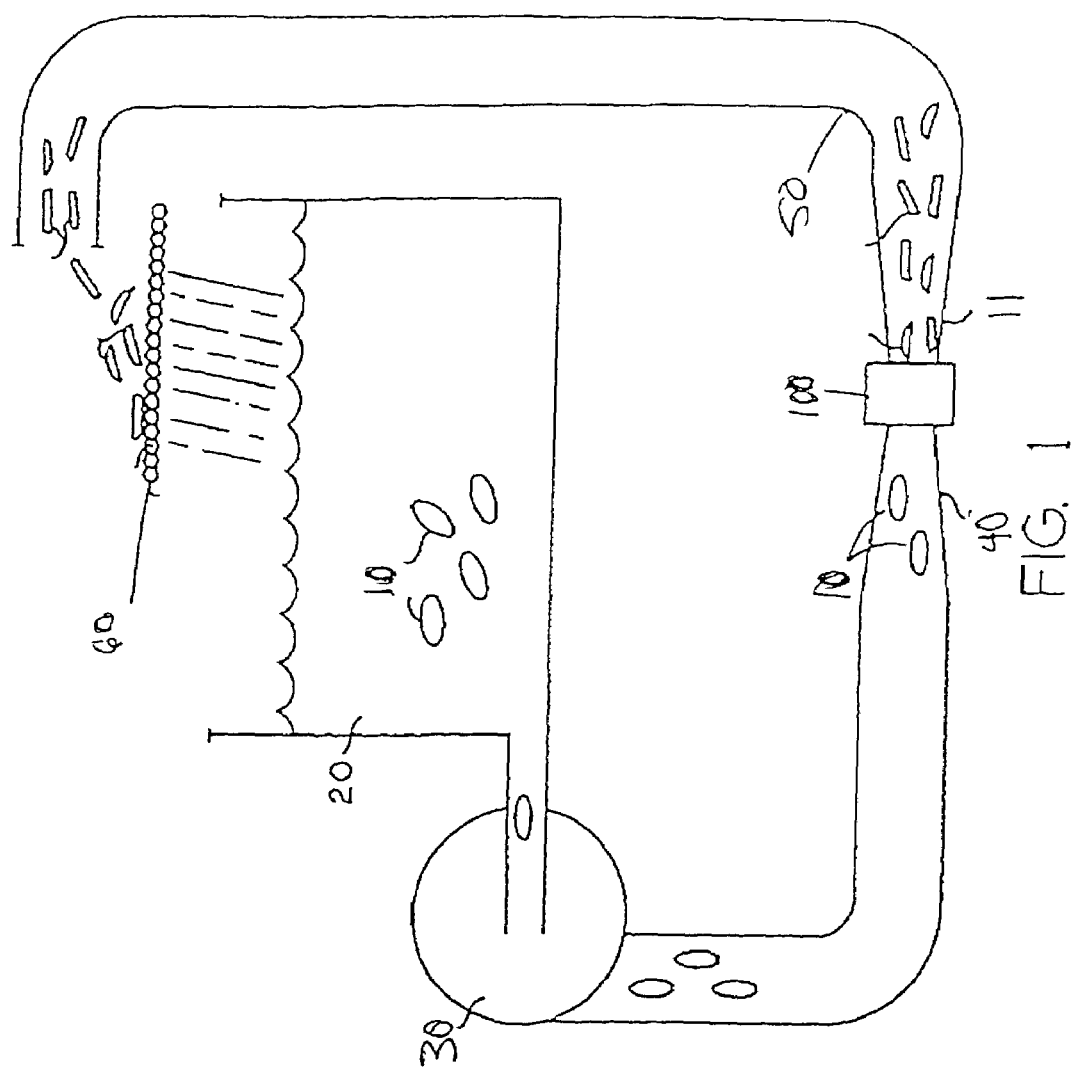
FIG. 1 is a schematic representation of a hydraulic cutting apparatus.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The preferred embodiment of the present invention is a cutter blade assembly designed to produce generally scalloped shaped potato pieces emulating a sectional portion of a cut stalk of celery. While in this embodiment the cutter blade assembly is configured to cut generally scoop shaped pieces, it is to be distinctly understood that this configuration is merely illustrative and that other forms and shapes can also be produced from modifications of the preferred embodiment and are contemplated and discussed herein. These alternative embodiments are to be seen as illustrative in nature and not restricting. This device may be used to produce shaped pieces that are suitable for freezing or immediate use and need no further cutting.

The equipment necessary to process raw potatoes into the desired shape for food product pieces as contemplated by this invention is schematically represented in FIG. 1. Referring to FIG. 1, raw whole potatoes 10 are dumped into the water filled receiving tank 20. Food pump 30, usually a single impeller centrifugal pump, draws its suction from receiving tank 20, and pumps water and the suspended potatoes 10 from the tank into nozzle gun 40.

Nozzle gun 40 functions as a venturi, which is used to accelerate and align potatoes 10 immediately prior to impinging upon the knives of cutter blade assembly 100. Cutter blade assembly 100 actually produces the scalloped shaped cut pieces. The scalloped shaped cut pieces 11 then enter into deceleration loop 50 which in effect is the second half of the venturi. The deceleration loop returns to a point above receiving tank 20 where the water and cut pieces 11 are deposited onto chain separator 60. The water passes through chain separator 60 and returns to receiving tank 20. Chain separator 60 is typically an endless loop chain or dewatering shaker, which is used to mechanically remove the cut pieces 11 from the hydraulic cutting apparatus assembly.

Figure 2:
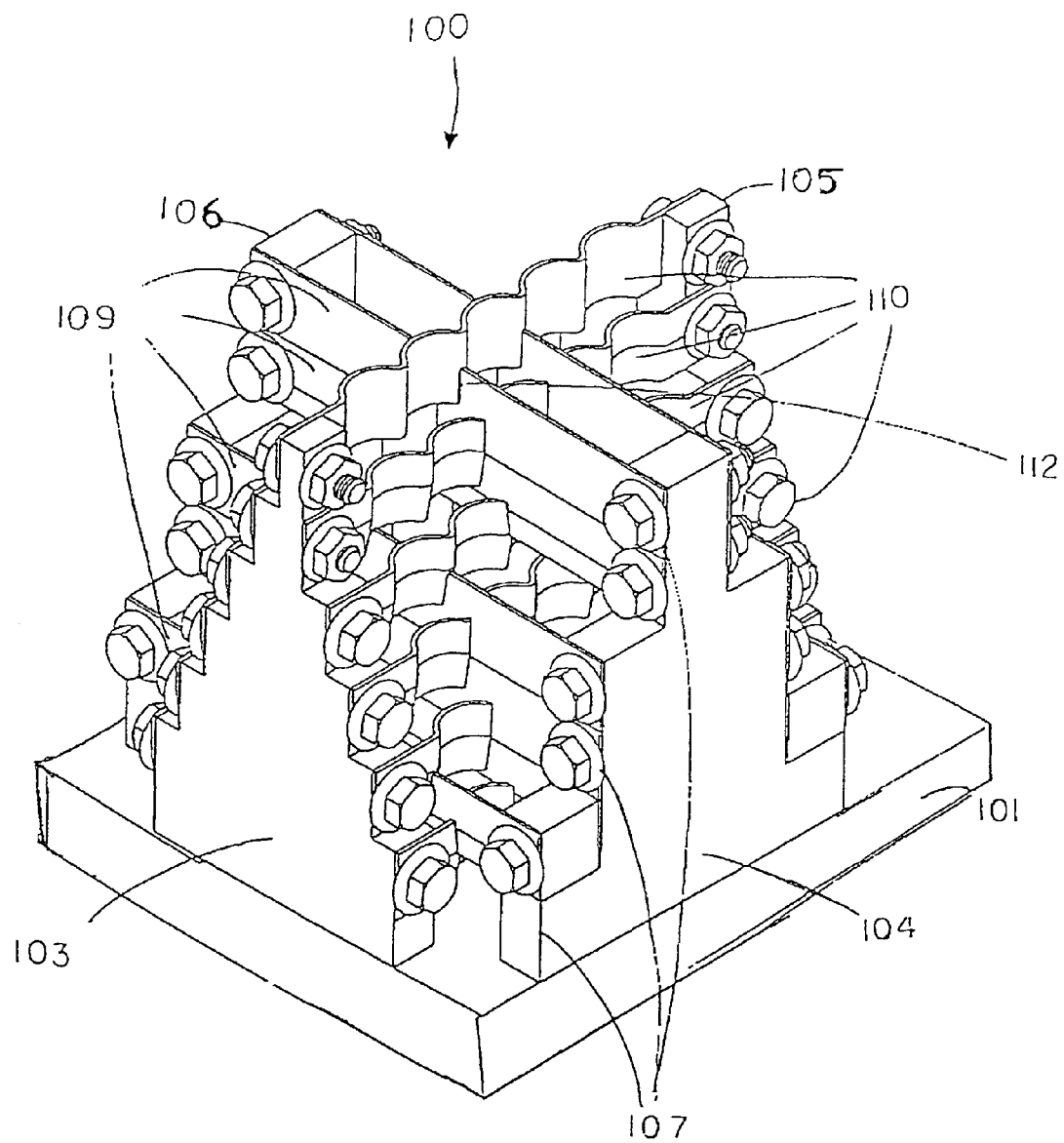
FIG. 2 is a representational perspective view of the preferred embodiment of the new cutter blade assembly.
Figure 3:
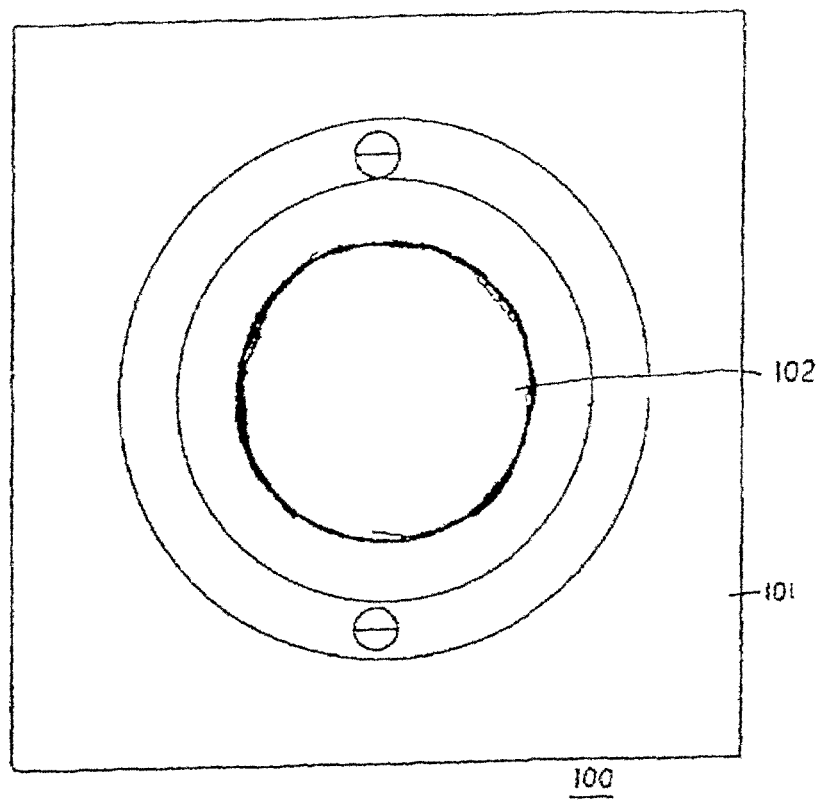
FIG. 3 is a front plan view of the preferred first embodiment.

Referring now to FIGS. 2–6, a first embodiment for cutter blade assembly is shown. FIG. 2 shows a cutter blade assembly 100 resting face down upon the front inlet adapter plate 101. In use, the cutter blade assembly 100 is attached to a front inlet adapter plate 101 and oriented so as to receive food products in a carrier medium through a hole or opening 102 for the longitudinal passageway positioned in the front inlet adapter plate (shown in FIG. 3). After passing through this hole 102 in the front inlet adapter plate 101, the food products travel generally along the longitudinal centerline of the cutter blade assembly 100 through staggered arrays of cutting knives 109, 110 before exiting cutter blade assembly 100. The front inlet adapter plate 101 can be sized so that it is retrofittable to a typical hydraulic food cutting apparatus.

Figure 4:
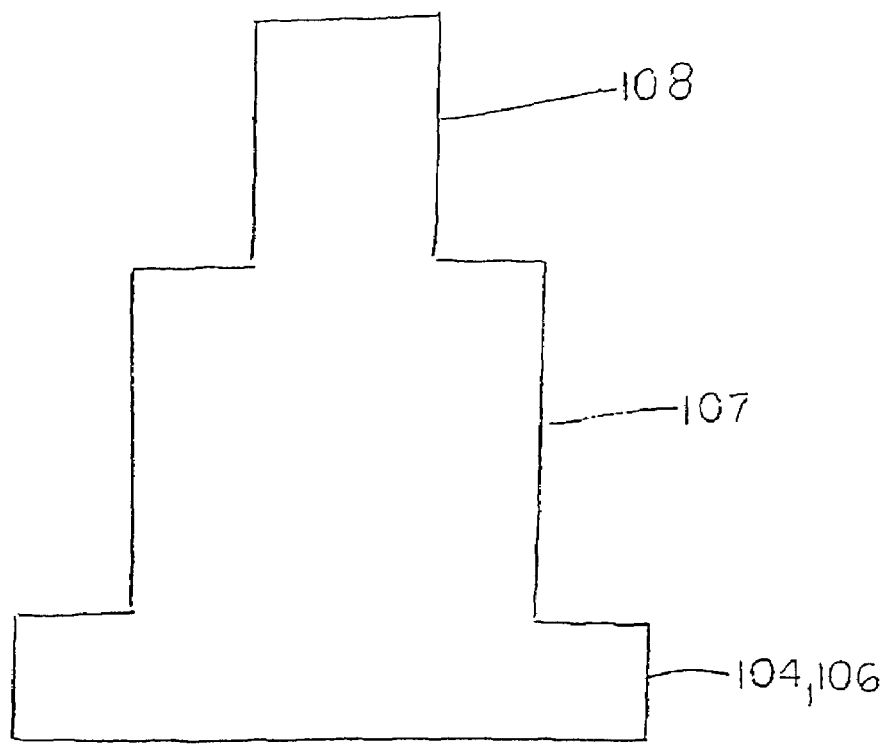
FIG. 4 is a first side view of a first frame member of the preferred embodiment.
Figure 5:
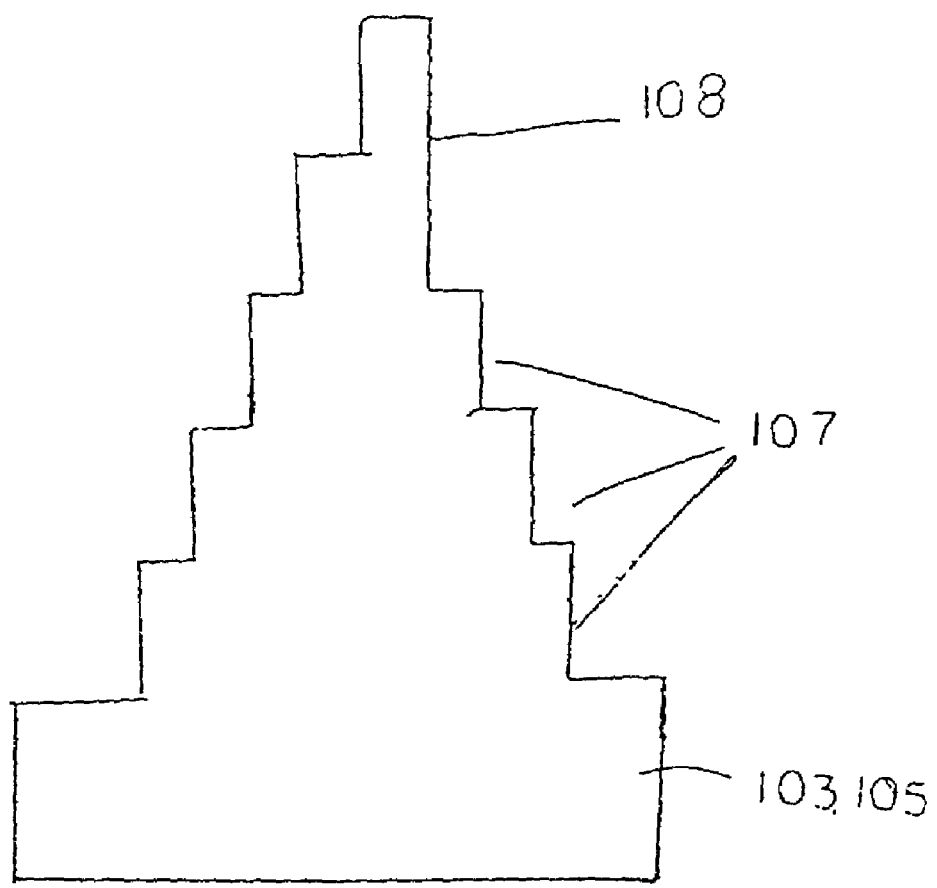
FIG. 5 is a first side view of a second frame member of the preferred embodiment.

Referring back to FIG. 2, the first pyramidal knife supports 103, 105 and the second pyramidal knife supports 104, 106 are attached in opposing pairs to the backside of the front inlet adapter plate 101 to form a pyramidal frame which defines the longitudinal passageway. As shown in FIGS. 4 and 5, pyramidal knife supports 103, 104, 105, 106 have a plurality of sequentially staggered attachment surfaces 107 disposed in a staggered manner along the pyramidal knife support sides. Each attachment surface 107 has an opposing attachment surface 107 located on an opposing pyramidal knife support of the same configuration equidistant from and parallel to the centerline axis of the longitudinal passageway of the cutter blade assembly 100.

In this embodiment, the second pyramidal knife supports 104,106 are configured to attach to two knives of the second plurality of knives 109, while the first pyramidal knife support members 103,105 are configured to connect only with a single knife of the first plurality of knives 110. In this embodiment, the knives 109, 110 have engagement slots 112 which are configured to connect the knives 109,110 in a generally interlocking relationship.

In addition, attaching the second plurality of knives 109 to the second pyramidal frame members 104, 106 so that the knives of the first plurality of knives 109 are supported in two directions, provides additional support to the knives of the first plurality of knives 110 and provides additional support to the entire cutting assembly 100. While in this embodiment the first plurality of knives 110 are shown as being supported in two directions by the second plurality of knives 109, this is not strictly necessary for the functioning of the cutting device. In other embodiments, the knives 109, 110 may be simply alternatively generally perpendicularly interspaced and attached to generally pyramidal frame members 103, 104, 105, 106 which support the knives 109,110.

The peak attachment surfaces 108 are disposed to intersect the centerline axis of any blade 109, 110 connecting to opposing peak attachment surfaces 108 and will exactly bisect the centerline axis, which is the optimum food path. In this embodiment, a single knife 110 is shown in the centerline of the food axis. While shown in this preferred embodiment, this single knife 110 located within the centerline is not truly necessary because the same effect may be obtained by altering the spacing of the pairs of the other knives 110.

The two types of knives 109, 110 used in this embodiment are shown in FIG. 2. FIG. 2 shows a pair of slotted strip knives 109, and the generally scalloped shaped contour knives 110. In other embodiments, the shape of the knives 109,110 can be varied to provide a desired shaped end product. For example, while contour knives 110 are shown as being generally scalloped shaped, a variety of other embodiments are also contemplated by this invention. These include but are not limited to embodiments where the contour knives 110 are generally alternatingly V-shaped or syncline, as well as other embodiments where a specific desired shape or pattern is desired. A desired shape may also be obtained by utilizing pairs of contour knives 110 that are not coordinated in orientation or shape. For example, inverting two V-shaped contour knives to produce a slab with mirror images aligned along a central axis could be accomplished utilizing the cutter assembly described in this invention. Other embodiments of blade shape and arrangement are also contemplated by this invention. In some embodiments, thinner cross knives can be used in the upper portions of the pyramidal frame structures 103, 104, 105, 106.

The contour knives 110 are made up of alternating peaks 116 that define alternating troughs 118. Passing a product through a parallel pair of scalloped shaped contour knives 110 produces a generally scalloped shaped slab having peaks and troughs corresponding to the space defined between the pair of scalloped shaped contour knives 110 through which the slab was passed. As a food product passes through the pyramidal shaped passageway, the size of the slabs cut by the pairs of contour knives 110 decreases until reaching a desired size. For example, a large vegetable piece passing through a first pair of contour knives 110 will be cut into a first slab having two edges correspondingly shaped to the first set of contour knives 110 and a thickness. As this cut slab progresses through the cutter assembly 100, this slab will be continuously cut into thinner slabs each with edges that correspond to the shape of the contour knives 110. The difference in spacing between a first pair of knives 110 and a second set of knives 110, and a second set of knives 110 and a third set of knives 110 correspond to the size of the slabs that will be produced. Depending upon the desires of the producer, these differences can be made uniform so that slabs having the same thickness are always produced, or they may be configured so that the slabs have different thicknesses.

Pairs of strip knives 109 are placed in generally perpendicular interspaced arrangement with the contour knives 110. This arrangement provides for structural support of the cutter blade assembly 100 and reinforces the intersecting knives 109, 110 against the impact from the vegetable product against the knives 109, 110. This arrangement also functions to cut the contoured slabs into generally elongated sections by each of the next encountered strip knife 109. In this embodiment, the strip knives 109 are shown as being generally straight, however it is to be understood that a variety of different embodiments could also be utilized depending upon the desired shape of the product. For example, if a product was desired that was generally symmetrical in all directions the strip knives 109 could be configured to have the same shape as the contour knives 110.

In other embodiments, the strip knives 109 could be arranged in different positions to vary the width or shape of the resulting food product. For example, in an embodiment where the contour knife 110 was corrugated with a plurality of generally V-shaped troughs, arranging straight strip knives 109 so that they would intersect with every peak of the slab would produce pieces that were generally V-shaped. Arranging straight strip knives so that they would intersect with every other peak would produce pieces that were generally W-shaped. Additionally, while in this embodiment the orientation of the knives is generally perpendicular, it is to be understood that this is simply an illustrative embodiment of the invention and that the scope of the invention is not limited thereto.

In the preferred embodiment, the knives 109, 110 are arranged perpendicular with the straight strip knives 109 intersecting with scalloped shaped knives 110 at the peak portions 116 of the scalloped shaped knife 110. After the food product has been cut into a scalloped shaped slab by the scalloped shaped strip knives 110, this slab is then cut into elongated scoop like portions by the straight strip knives 109. In this embodiment, the connection between the straight knives 109 and the generally scalloped shaped knives 110 is enhanced by the presence of interlocking slots 112 and notches 114. These slots 112 and notches 114 function to maintain and support the position of the first plurality of knives 110 with the second plurality of knives 109.

While in this embodiment the slots 112 and notches 114 are located on both the contour knives 110 and the strip knives 109, it is to be understood that this is solely illustrative. The slots 112 and the notches 114 are not required to be placed in any particular location or upon any particular knife 109, 110. The presence or absence of these notches or grooves provide support to the knives but are not required elements of the invention.

The sequential arrangement of knives and their sequentially perpendicular orientation, as shown in FIG. 2, results in the whole food product impinging upon one cutting array at a time, in sequence. This minimizes the drag resulting from searing and frictional forces during the cutting process. Also, the staggered sequential array of cutting knives eliminates compressive forces on cut food segments resulting from compression in a passageway defined by more than two cutting knives in an array of the typical prior art cutting apparatus. The removable attachment of all of the strip knives 109, 110 is shown here by the use of bolts and hex nuts. It is necessary to provide for removable attachment so that the strip knives 109, 110 may be sharpened and replaced when necessary. However the exact means for providing such removable attachment can be variable and is not required to be the illustrated method.

Figure 6:
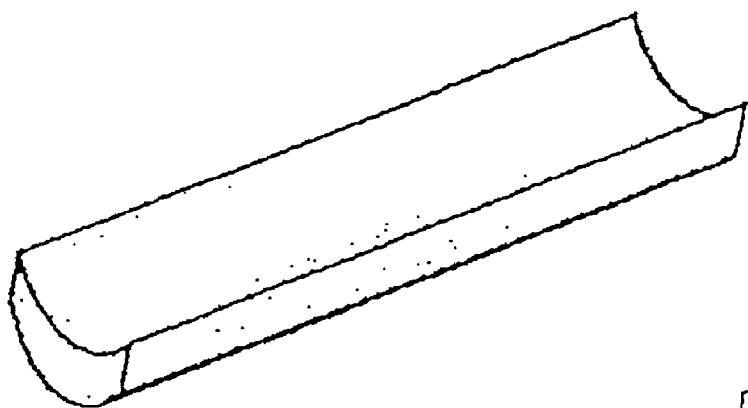
FIG. 6 is a perspective representational view of a cut food piece made by the invention.

When fully assembled, the sequential arrays of slotted strip knives 109, together with the generally scalloped shaped strip knives 110, form a cutting pattern which provides for cutting a food product (F) into segments having a shape generally emulating a cut stock of celery as shown in FIG. 6.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A cutter blade assembly for use in a food cutting apparatus comprising:
   a frame comprised of knife supports, said frame defining a longitudinal passageway having upstream and downstream ends for passage of food product and carrier medium therethrough;
   a first plurality of strip knives configured in pairs, each knife of said first plurality of strip knives being generally scalloped in shape and having a series of peak portions interspaced with a series of trough portions, each knife of said first plurality of strip knives removably attached to said frame in parallel spaced relation with an opposing knife along said longitudinal passageway, each pair of said first plurality of strip knives configured to cut a vegetable product into a slab having two correspondingly corrugated sides,
   said pairs of said first plurality of strip knives being spaced farthest apart at a widest base portion at said upstream end of said longitudinal passageway and spaced progressively closer together in a generally pyramidal configuration until arriving at a narrowest spacing at said downstream end; and
   a second plurality of strip knives generally perpendicularly positioned against the peak portions of said generally scalloped shaped first plurality of strip knives so as to cut the generally corrugated slabs into generally elongated tubular pieces, said second plurality of strip knives connected to said frame in alternating interspaced pairs perpendicularly engaging an adjacent pair of said first plurality of strip knives at a peak portion of each of said strip knives.

2. The cutter blade assembly of claim 1 wherein said second plurality of strip knives define engagement slots that engage an adjacent pair of said first plurality of strip knives in perpendicular spaced relationship.

3. The cutter blade assembly of claim 1 wherein each of said second plurality of strip knives is generally straight.

4. The cutter blade assembly of claim 1 wherein each of said first plurality of strip knives further define engagement slots that perpendicularly engage an adjacent pair of said second plurality of strip knives.

5. The cutter blade assembly of claim 4 wherein said engagement slots are defined within said peak portions of said first plurality of strip knives.

6. A cutter blade assembly for use in a food cutting apparatus comprising:
   a frame comprised of pairs of knife supports, said frame defining a longitudinal passageway having upstream and downstream ends for passage of food product and carrier medium therethrough;
   a first plurality of strip knives configured in pairs, each knife of said first plurality of strip knives being generally corrugated and comprised of V-shaped portions having a series of peaks interspaced with a series of troughs, each knife of said first plurality of strip knives removably attached to said frame in parallel spaced relationship with an opposing knife along said longitudinal passageway, each pair of knives configured to cut a vegetable product into a slab having two correspondingly corrugated sides, each side comprised of said V-shaped portions, said pairs of said first plurality of strip knives being spaced farthest apart at a widest base portion at said upstream end of said longitudinal passageway and spaced progressively closer together in a generally pyramidal configuration until arriving at a narrowest spacing at said downstream end; and
   a second plurality of strip knives for cutting said slabs into generally elongated pieces, said second plurality of strip knives connected to said frame in alternating interspaced pairs perpendicularly engaging an adjacent pair of said first plurality of strip knives at a peak of each of said strip knives.

7. The cutter blade assembly of claim 6 wherein said second plurality of strip knives define engagement slots that engage an adjacent pair of said first plurality of strip knives in perpendicular spaced relationship.

8. The cutter blade assembly of claim 6 wherein each of said second plurality of strip knives is generally straight.

9. The cutter blade assembly of claim 6 wherein each of said first plurality of strip knives further define engagement slots therein that perpendicularly engage an adjacent pair of said second plurality of strip knives.

10. The cutter blade assembly of claim 9 wherein said engagement slots are defined within said peak portions of said first plurality of strip knives.

11. A cutter blade assembly for use in a food cutting apparatus comprising:
    a frame comprised of pairs of knife supports, said frame defining a longitudinal passageway having upstream and downstream ends for passage of food product and carrier medium therethrough;
    a first plurality of strip knives positioned in pairs, each pair shaped and positioned to cut a vegetable product into a scalloped shaped slab, each knife of said first plurality of strip knives having a series of peak portions interspaced with a series of trough portions, each knife of said first plurality of strip knives removably attached to said frame in parallel spaced relation with an opposing knife along said longitudinal passageway, each knife of said first plurality of strip knives define engagement slots within said peak portions, said pairs of said first plurality of strip knives being spaced farthest apart at a widest base portion at said upstream end of said longitudinal passageway and spaced progressively closer together in a generally pyramidal configuration until arriving at a narrowest spacing at said downstream end; and
    a second plurality of strip knives generally perpendicularly engaging said first plurality of strip knives at said engagement slots, said second plurality of strip knives for cutting said scalloped shaped slabs into generally elongated tubular shaped pieces, said second plurality of strip knives connected to said frame in alternating interspaced pairs.

12. The cutter blade assembly of claim 11 wherein said second plurality of strip knives define engagement slots configured to engage an adjacent pair of said first plurality of strip knives in perpendicular spaced relationship.

13. The cutter blade assembly of claim 11 wherein each of said second plurality of strip knives is generally straight.

* * * * *